W. WHITE.
CENTER BEARING.
APPLICATION FILED SEPT. 21, 1908.

976,326.

Patented Nov. 22, 1910.
3 SHEETS—SHEET 1.

Witnesses
Milton Lenoir
E. Kermeen

Inventor
William White
By Heideman & Street
Attorneys,

W. WHITE.
CENTER BEARING.
APPLICATION FILED SEPT. 21, 1908.
976,326.
Patented Nov. 22, 1910.
3 SHEETS—SHEET 2.
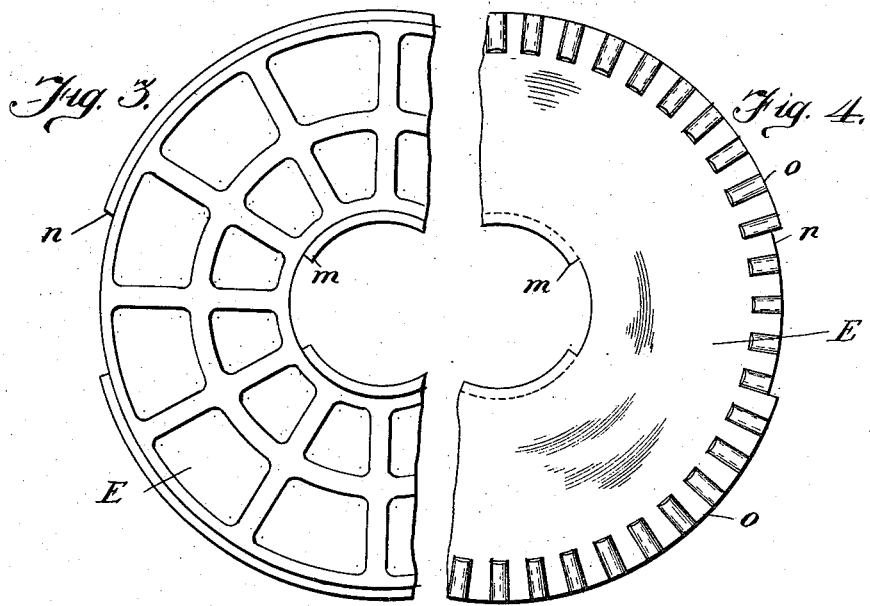
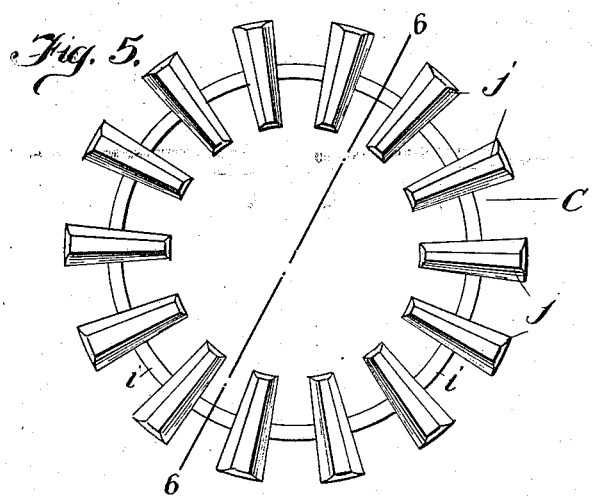
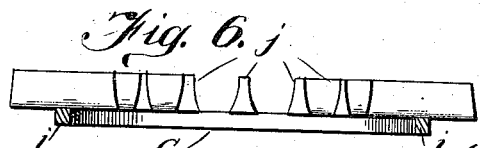
Witnesses
Milton Lenoir
E. Kernwein
Inventor
William White
By Heidman & Steel
Attorneys.

W. WHITE.
CENTER BEARING.
APPLICATION FILED SEPT. 21, 1908.

976,326.

Patented Nov. 22, 1910.
3 SHEETS—SHEET 3.

Witnesses
Milton Lenoir
E. Kernwein

Inventor
William White
By Heidman & Stroud
Attorneys.

UNITED STATES PATENT OFFICE.

WILLIAM WHITE, OF CHICAGO, ILLINOIS.

CENTER-BEARING.

976,326.  Specification of Letters Patent.  Patented Nov. 22, 1910.

Application filed September 21, 1908. Serial No. 453,982.

*To all whom it may concern:*

Be it known that I, WILLIAM WHITE, a citizen of the United States, and resident of Chicago, in the county of Cook and State of Illinois, have invented certain new and useful Improvements in Center-Bearings, of which the following is a description, reference being had to the accompanying drawings, which form a part of my specification.

My invention relates to center-bearings for railway cars and the like, the object being to provide a construction that will not only be practically frictionless, but one in which the parts will be held or locked into place and thereby prevent the different parts from readily getting out of proper position when the bearing is subjected to any undue or unusual strain by reason of unusual conditions.

A further object is to provide a bearing which can readily be assembled and which is so constructed that the correct assembling of the parts will be insured, thus preventing any possibility of the parts binding or interlocking in any manner, as will appear from the following detailed description.

Figure 1:
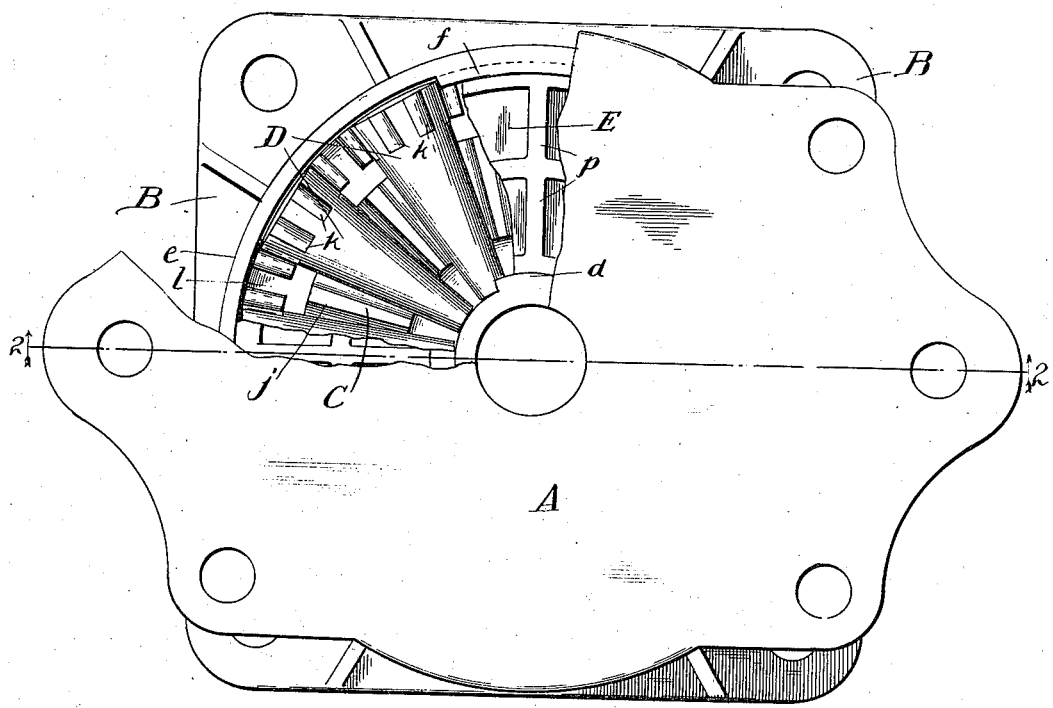
Figure 2:
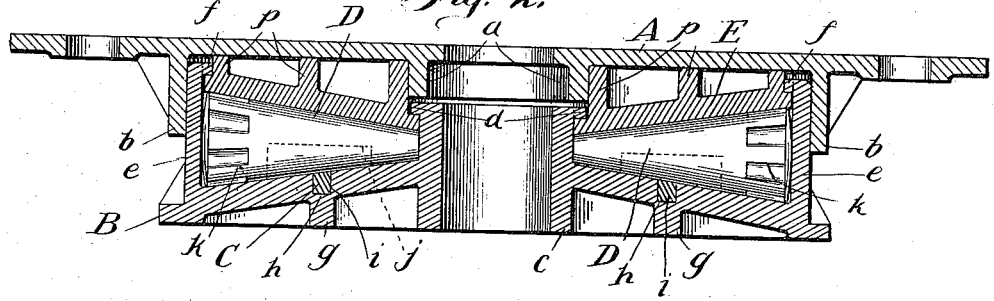
Figure 7:
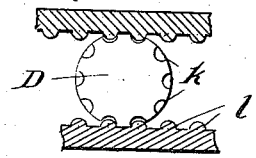
Figure 8:
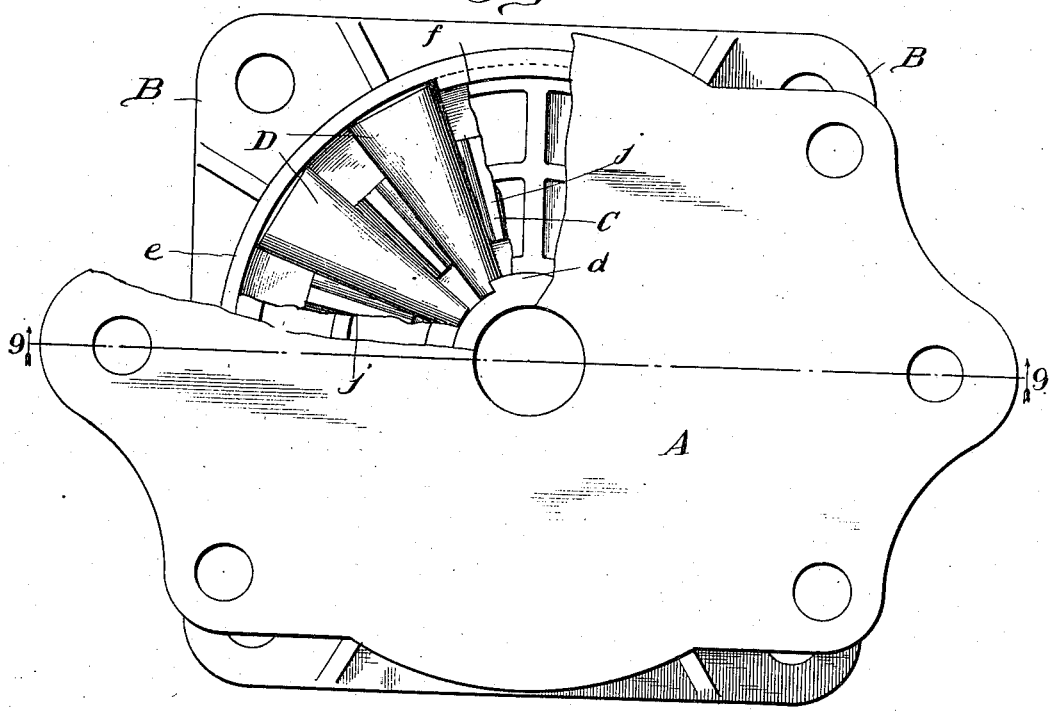
Figure 9:
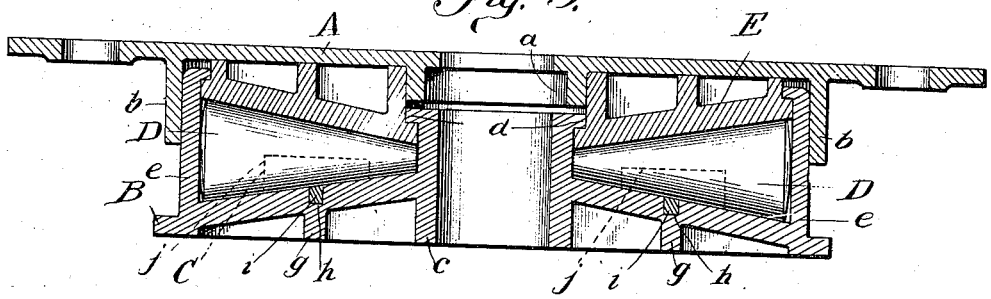

In the drawings:—Figure 1 is a top plan view of my improved bearing, with a portion of the top member and intermediate or driving member broken away. Fig. 2, is a cross-sectional view taken on the line 2—2 of Fig. 1. Fig. 3, is a top view of a portion of the intermediate member or driving-plate; and Fig. 4, is a bottom view of the same. Fig. 5, is a plan view of the separating member or ring; and Fig. 6 is a sectional view taken on the line 6—6 of Fig. 5. Fig. 7 is a diagrammatic view to show the relation of the cone-bearing to the bottom and intermediate members of the bearing. Fig. 8 is a view similar to Fig. 1 but showing a modified construction; and Fig. 9 is a cross-sectional view taken on line 9—9 of Fig. 8.

In the drawings, A and B are the outside or top and bottom members, respectively, which are provided with the usual bolt-holes so that they may be secured in place. The top member A is preferably provided with downwardly-extending annular flanges $a$ and $b$. Member B is provided with the hub $c$, and the bearing-surface extends downwardly toward its periphery in order to have it conform to the style of bearing illustrated. A portion of the upper part of the hub $c$ on member B is provided with a shoulder or horizontally disposed rim-portions $d$. The outer edge of member B is provided with the peripheral flange or portion $e$, the upper edge of which is also provided with the preferably integrally formed inwardly extending and horizontally disposed rim-portions or shoulder $f$, at a point diametrically opposite the shoulder or rim-portions $d$. Member B may be provided with the reinforcing rib $g$. In the construction shown, member B is provided on its upper surface with a circumferential groove at $h$, into which the ring-portion of the spacing and separating member C, shown in Fig. 6 takes. This separating or spacing member C comprises the ring-portion $i$, on which are mounted the radially extending spacing-portions $j$, which are spaced apart a sufficient distance to receive between them the bearing-rollers D. The rollers are preferably cone-shaped, and when desired may be provided at or near their outer ends with teeth $k$ as illustrated in Figs. 1, 2 and 7. When this construction is used, the member with which the rollers contact is provided with an annular extending rack as for instance at the point 1, on member B with which the teeth on the rollers mesh.

Provided with a central opening to permit it to take about the main portion of the hub of member B, is an intermediate or driving-member E. The inner and outer peripheries of member E are provided with cut-away portions or notches as at $m$, $n$, which are formed at points to correspond with the rim-portions or shoulders $d$ and $f$ on the hub $c$ and the portion or flange $e$ of member B, which in the drawings are shown preferably diametrically opposite each other. These notches or cut-away portions $m$, $n$, are large enough to permit intermediate member E to be placed below the shoulders or rim-portions on the hub and flange and in contact with the roller-bearings. In the preferred construction shown in Figs. 1 and 2, member E is also provided with an annular rack $o$, at or near its outer circumference which meshes with the teeth on the cone-bearings D, so that any movement of member E will be imparted to the roller-bearings, as is also the case when member B is moved.

The bearing is assembled by first placing spacing or separating member C in the groove h in member B; the roller-bearings D are then placed into the sockets or pockets intermediate of the radially extending portions j, which insure the proper placing of the roller-bearings; intermediate member E is then placed on top of the cone or roller-bearings, which is accomplished by bringing the notches or cut-away portions m, n, to register with the segmental shoulders or rim-portions d and f on the member B. After member E has been inserted into place, member A, is placed over the assembled parts, when the bearing is in condition for use. Member E is of course made to conform in shape to the shape of the roller-bearings employed, and I therefore prefer to provide it with the annular ribs or upward extensions p, the upper surfaces of which lie in the same horizontal plane and thus provide a bearing surface for member A; the outer circumferential rib or extension of course being formed slightly in from the periphery of member E so as to permit the member to take under the rim-portions or shoulders on member B as before described.

It will be seen that with the upwardly extending portion or flange on member B and the downwardly extending circumferential flange b, which takes about the flange on member B, a completely inclosed bearing is produced, thus obviating any possibility of dirt or undesirable matter getting into the bearing. Furthermore, it will be seen, that a bearing is produced wherein the rollers or cones are securely locked in place to one of the members, so that there is less likelihood of the rollers or cones becoming lost or jolted out of place during any unusual treatment of the bearing; but instead, aside from the possible pulling away of member A, the bearing will remain in its assembled condition by reason of the intermediate member also acting as a locking means for the cones or rollers. It is apparent that when member A is moved it will bear upon the extensions or ribs of member E, compelling this member to turn, and when the positive or tooth and rack connection between intermediate member or locking means E and the roller-bearings is employed, the latter are compelled to turn.

In Figs. 8 and 9 I have illustrated one style of modification of my improved center-bearing, wherein the teeth on the cone-bearings D and the annular racks on members B and E are omitted. The construction in other respects is identical to that heretofore described.

The advantages of my improved bearing are readily apparent; and it is also evident that the construction shown and described may be varied in a number of details without departing from the spirit of my invention, and I do not wish to be understood therefore as limiting myself to the exact construction shown and described, but

What I claim as my invention, and wish to secure by Letters Patent, is:—

1. A center-bearing, comprising upper and lower members adapted to over-lap each other, one of said members being provided with a hub, a plurality of rollers arranged on the member with the hub, and a third member intermediate of the rollers and the member without the hub adapted to receive the thrust of said member and having positive engagement with the rollers.

2. A center-bearing, comprising upper and lower members, a plurality of rollers arranged on the one member, a third member intermediate of the rollers and one of the other members, said intermediate member being adapted to receive the thrust of one of the outer members and having engagement with the member on which the rollers are arranged whereby it is held against vertical displacement.

3. A center-bearing, comprising an upper and a lower member, one of said members being provided with a hub having horizontally disposed rim-portions, a plurality of rollers arranged on the member with the hub, and a third member adapted to take onto the rollers and beneath the rim-portions on the hub whereby the rollers and member are locked against vertical displacement, said third member being adapted to receive the thrust of the adjacent outer member.

4. A center-bearing, comprising upper and lower members, a plurality of rollers arranged on the one member, a third member intermediate of the rollers and one of the other members, said intermediate member having engagement with the member on which the rollers are arranged whereby it is held against vertical displacement, and a spacing-member taking between each of the rollers to maintain their proper relation.

5. A center-bearing for railway-cars and the like, comprising an upper and a lower member, a plurality of rollers arranged on one of said members and having positive engagement therewith, and a driven member intermediate of the rollers and one of said members and having positive engagement with the rollers, said driven member being arranged to receive the thrust of the adjacent outer member.

6. A center-bearing for railway-cars and the like, comprising a top and a bottom member formed to overlap each other, a plurality of rollers arranged on one of said members and having positive engagement therewith, and a third or intermediate member arranged between one of the members and the rollers and having positive engagement with the latter, said third member being adapted to receive movement from the adjacent outer member and conveying same to the rollers.

7. In a center-bearing for railway-cars and the like, the combination of an upper and a lower member, a plurality of rollers arranged on the one member, a third member intermediate of the rollers and one of the other members, said third member being arranged to receive the thrust of the adjacent member, with means intermediate of the member on which the rollers are arranged and said third member whereby the two members are normally locked against vertical displacement.

8. A center-bearing for railway-cars and the like, comprising upper and lower members, a plurality of rollers arranged on one of said members, and means taking onto and being intermediate of the rollers and one of said members and having locking engagement with the member on which the rollers are arranged whereby the rollers are locked against vertical displacement, said means being arranged to receive the thrust of the adjacent outer member, said means and the member to which the means is locked being formed to insure the positive movement of the rollers upon the relative movement of the members.

9. A center-bearing, comprising an upper and a lower member, one of said members being provided with a hub, a plurality of rollers arranged on the member with the hub, and means adapted to take about said hub and onto the rollers and lock the rollers against vertical movement, said means being adapted to receive the thrust of the member without the hub.

10. A center-bearing, comprising an upper and a lower member, one of the members being provided with an inwardly extending hub, a plurality of rollers arranged on said member, means taking about said hub and onto the rollers whereby the latter are locked against vertical movement, said means being adapted to receive the thrust of the adjacent member, and means whereby the positive rotation of the rollers is insured upon the movement of the members.

11. A center-bearing comprising an upper and a lower member, the one member being provided with a hub and a peripheral flange, a plurality of rollers arranged on said member, and an intermediate member adapted to take onto said rollers and be locked in place by said hub and flange, said intermediate member being arranged to receive the thrust of the adjacent member.

12. A center-bearing comprising an upper and a lower member, the one member being provided with a hub and a peripheral flange, a plurality of rollers arranged on said member, a third member intermediate of the rollers and the member without the hub and adapted to engage with said hub and flange to lock the rollers on one of said members against vertical displacement, said third member taking onto the rollers and receiving the thrust of the adjacent outer member.

13. A center-bearing, comprising an upper and a lower member, the one member being provided with a hub and a peripheral flange, a plurality of rollers arranged on said member, an intermediate member adapted to take onto said rollers and be locked in place by said hub and flange, the intermediate member formed to receive the thrust of the adjacent outer member, and means whereby positive rotation of the rollers is insured upon the movement of the members.

14. A center-bearing, comprising an upper and a lower member, the one member being provided with a hub and a peripheral extension, a plurality of rollers arranged on said member, a third member intermediate of the rollers and the member without the hub and adapted to receive the thrust of said last mentioned member, said intermediate member being arranged to engage with said hub and flange to lock the rollers on said member with the hub, and means whereby positive rotation of the rollers is insured upon the movement of the members.

15. A center-bearing, comprising outside members, a plurality of rollers arranged on one of said members and having positive engagement therewith, and an intermediate member arranged between the rollers and an outside member and having positive engagement with the rollers, said intermediate member being adapted to receive the movement of the member adjacent.

16. A center-bearing, comprising outside members and an intermediate member, a plurality of anti-friction bearing-devices interposed between said intermediate member and one of the outside members and having positive engagement therewith, and spacing means intermediate of the bearing-devices and one of the outside members and having radially extending portions between the anti-friction bearing-devices whereby the latter are positioned.

17. A center-bearing, comprising outside members and an intermediate member, a plurality of rollers interposed between said intermediate member and one of the outside members, the intermediate member having engagement with said outside member whereby the same is locked against vertical movement, said intermediate member being adapted to receive the thrust of the adjacent outside member.

18. A center-bearing, comprising outside members and an intermediate member, a plurality of rollers interposed between said intermediate member and one of the outside members, and having positive engagement therewith, the intermediate member engaging with said outside member to lock it and the interposed rollers against vertical movement, said intermediate member being adapted to receive the movement of the adjacent outside member.

19. A center-bearing, comprising upper and lower members, a plurality of conical rollers having positive engagement with one of said members, a third member intermediate of one of the outside members and the rollers and having positive engagement with the latter and adapted to receive the movement of the outside member, and means provided with sockets at predetermined intervals to receive the conical rollers and maintain their proper relation to each other.

20. A center-bearing, comprising upper and lower members, a plurality of conical rollers having positive engagement with one of said members, a third member intermediate of one of the outside members and the rollers and having positive engagement with the latter, said third member engaging with the outside member with which the rollers engage whereby vertical displacement of the rollers and third member is prevented, and means provided with sockets at predetermined intervals to receive the conical rollers and maintain their proper relation to each other.

21. A center-bearing, comprising upper and lower members, one of said members being provided with a hub and an annular flange about its outer edge, a third member adapted to engage with said hub and flange and be held against vertical movement, said third member being arranged to receive the movement of the adjacent outer member, and a plurality of rollers interposed between said third member and one of the other members and having positive engagement therewith.

22. A center-bearing comprising upper and lower members, one of which is provided with a hub and an annular flange about its outer edge, and the other having an annular flange adapted to overlap the flange on the first member, a third member adapted to engage with said hub and first mentioned flange whereby it is normally held against vertical movement, said third member being formed to bear against the adjacent outer member and receive its thrust, and a plurality of rollers interposed between said third member and the member with the hub and having positive engagement therewith.

23. A center-bearing, comprising upper and lower members, one of said members being provided with a hub and an annular flange about its outer edge, the hub and flange being provided with segmental rim-portions, a third member adapted to lie between the hub and flange and beneath the segmental rim-portions to be normally held against vertical displacement and receive the thrust of the adjacent outer member, and a plurality of rollers interposed between said third member and the member with the hub and having positive engagement therewith.

24. A center-bearing comprising upper and lower members, one of said members being provided with a hub and an annular flange about its outer edge, the hub and flange being provided with horizontally disposed rim-portions, a third member adapted to take between the hub and flange and beneath the rim-portions to be locked against vertical displacement, said third member being formed to bear against the under face of the adjacent outer member and receive the movement thereof, and a plurality of rollers interposed between said third member and the member with the hub and having positive engagement therewith.

25. A center-bearing, comprising upper and lower members, one of said members being provided with a hub and an annular flange about its periphery, the hub and flange being provided with horizontally disposed shoulders, a third member provided with peripheral notches adapted to register with said shoulders to permit of the insertion of said third member beneath said shoulders, said third member being adapted to receive the movement of the adjacent member, and a plurality of rollers interposed between said third member and the member with the hub and having positive engagement therewith.

26. A center-bearing, comprising an upper and a lower member formed to inclose the space between them, one of the members being provided with a hub and peripheral flange which have horizontally disposed rim-portions, an intermediate member having peripheral notches adapted to register with the rim-portions to permit said member to be secured to the member with the hub, a plurality of rollers interposed between said intermediate member and the member with the hub, and means adapted to take between each of the rollers and maintain their proper position.

27. A center-bearing, comprising outside members and an intermediate member, one of said outside members having a hub and a peripheral flange, said hub and flange being provided with horizontally-disposed rim-portions, the intermediate member being adapted to take beneath said rim-portions and be locked against vertical displacement, said intermediate member having vertically disposed shoulders on its one face to receive the thrust of the adjacent outside member, and a plurality of rollers interposed between the intermediate member and outside member with the hub.

28. A center-bearing, comprising upper and lower members, a plurality of rollers having sockets in their peripheries, a third member arranged intermediate of the rollers and one of the other members, said third member and one of the other members having means adapted to register with the sockets in the rollers, and means whereby the third member is locked to the member with which the rollers engage.

29. A center-bearing, comprising upper and lower members, a plurality of rollers having sockets in their bearing surfaces, a third member arranged intermediate of the rollers and one of the other members, said third member and one of the other members being provided with means adapted to engage in the roller-sockets, and means whereby the third member is locked to the member with which the rollers engage, said means normally tending to prevent the displacement of the third member and rollers.

30. A center-bearing, comprising upper and lower members formed to inclose the space between them, a plurality of rollers provided with sockets in their peripheries, a third member intermediate of the rollers and one of the outer members, circumferential racks arranged on the surfaces of said third member and one of the outer members, adapted to engage with the sockets in the rollers, and means whereby the third or intermediate member is normally locked to the member with which the rollers engage.

31. A center-bearing, comprising an upper and a lower member formed to inclose the space between them, a plurality of rollers having rack and tooth engagement with one of said members, an intermediate member adapted to engage with said rollers and receive the thrust of the adjacent member, and means whereby the intermediate member is locked against vertical displacement and the rollers retained in place.

32. A center-bearing, comprising upper and lower members formed to inclose the space between them, a plurality of rollers provided with sockets in their peripheries, a third member intermediate of the rollers and one of the other members, the third member and one of the other members being provided with circumferential racks adapted to engage in the roller-sockets, means whereby the third member is locked to the member with which the rollers engage, and mechanism intermediate of each of said rollers whereby their position is maintained.

33. A center-bearing, comprising upper and lower members, the one member being provided with a hub and peripheral flange, a plurality of rollers arranged on said member between the hub and flange, a third member intermediate of the rollers and one of the members and adapted to bear against and receive the thrust of the latter, and means whereby the third member is normally locked to the member with the hub against vertical displacement.

34. A center-bearing, comprising upper and lower members, said members being provided with peripheral flanges, the flanges of one member having horizontally-disposed rim-portions, a plurality of rollers arranged on said member, and a third member adapted to take onto the rollers and beneath the rim-portions on the flange, whereby the member and rollers are locked against vertical displacement, said third member being adapted to bear against the under face of one of the outer members and receive its thrust.

35. A center-bearing, comprising upper and lower members having flanges adapted to over-lap, a plurality of rollers arranged on one of the members, a third member intermediate of the rollers and one of the other members and adapted to support the latter, and means whereby said third member is locked in engagement with the member on which the rollers are arranged, to hold the latter against vertical displacement.

36. A center-bearing, comprising upper and lower plates, a plurality of rollers, a third plate arranged intermediate of the rollers and one of the outer plates to receive the thrust of said outer plate, and a spacing-member provided with radially-extending portions adapted to extend between each of the rollers to maintain their proper relation.

37. A center-bearing comprising outside members, a plurality of rollers arranged on one of said members, an intermediate member arranged on the rollers and having a loose engagement with one of the other members whereby its vertical movement is normally prevented, and a spacing-member seated in one of the members and having radially-extending portions to take between the rollers and maintain the proper relation to each other.

38. A center-bearing, comprising two outside members, one of said members having a hub and peripheral flange, the upper edges of which are provided with shoulders at selected points, a plurality of rollers arranged on said member, and a third member, on which one of the outside members bears and conveys its movement thereto, provided with notches adapted to register with the shoulders to permit said member to take beneath said shoulders and onto the rollers and be normally locked against vertical displacement.

39. A center-bearing, comprising upper and lower members, the one member being provided with a hub and peripheral flange, a plurality of rollers arranged on said member between the hub and flange, a third member intermediate of the rollers and one of the members and adapted to receive the thrust of the latter, means intermediate of the rollers and the two members adjacent thereto, whereby the movement of either of said members is conveyed to the rollers, and means whereby the third member is locked to the member with the hub.

WILLIAM WHITE.

Witnesses:
 FLORENCE LAIRD,
 NORMAN A. STREET.